(12) United States Patent
Sasidharan

(10) Patent No.: US 11,445,059 B2
(45) Date of Patent: Sep. 13, 2022

(54) METHOD AND APPARATUS FOR AN ADAPTIVE MOBILE DEVICE VEHICLE CONTROL APPLICATION

(71) Applicant: FORD GLOBAL TECHNOLOGIES, LLC, Dearborn, MI (US)

(72) Inventor: Sandeep Sasidharan, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 485 days.

(21) Appl. No.: 16/381,595

(22) Filed: Apr. 11, 2019

(65) Prior Publication Data
US 2020/0329135 A1    Oct. 15, 2020

(51) Int. Cl.
| | | |
|---|---|---|
| H04M 1/72415 | (2021.01) | |
| G06Q 50/30 | (2012.01) | |
| H04W 4/80 | (2018.01) | |
| H04W 4/48 | (2018.01) | |
| H04M 1/72406 | (2021.01) | |
| H04M 1/72412 | (2021.01) | |
| H04W 12/0431 | (2021.01) | |

(52) U.S. Cl.
CPC ........ *H04M 1/72415* (2021.01); *G06Q 50/30* (2013.01); *H04M 1/72406* (2021.01); *H04M 1/72412* (2021.01); *H04W 4/48* (2018.02); *H04W 4/80* (2018.02); *H04W 12/0431* (2021.01)

(58) Field of Classification Search
CPC ......... H04M 1/72415; H04M 1/72406; H04M 1/72412; H04M 1/6091; H04W 12/0431; H04W 4/80; H04W 4/48; H04W 4/40; G06Q 50/30
See application file for complete search history.

(56) References Cited

U.S. PATENT DOCUMENTS

| | | | |
|---|---|---|---|
| 10,289,288 B2 * | 5/2019 | Penilla | .................... H04L 67/12 |
| 2014/0163771 A1 | 6/2014 | Demeniuk | |
| 2017/0178035 A1 | 6/2017 | Grimm et al. | |
| 2017/0308365 A1 | 10/2017 | Cermak et al. | |
| 2018/0072190 A1 | 3/2018 | Kowalski et al. | |

FOREIGN PATENT DOCUMENTS

| | | |
|---|---|---|
| KR | 20120045650 A | 5/2012 |
| KR | 20140020116 A | 2/2014 |
| KR | 20180043049 A | 4/2018 |

* cited by examiner

*Primary Examiner* — Eugene Yun
(74) *Attorney, Agent, or Firm* — Gregory P. Brown; Brooks Kushman P.C.

(57) ABSTRACT

A system includes a mobile device that requests a control file, defining a plurality of available vehicle controls. The mobile device also receives the control set file and populate a mobile device interface based on the available vehicle controls. The mobile device then receives selection of one of the vehicle controls via the mobile device interface. The mobile device then configures a vehicle function call, defined in accordance with the vehicle-control in the control file and transmits the configured vehicle function call to a vehicle.

17 Claims, 3 Drawing Sheets

METHOD AND APPARATUS FOR AN ADAPTIVE MOBILE DEVICE VEHICLE CONTROL APPLICATION

The illustrative embodiments generally relate to methods and apparatuses for an adaptive mobile device vehicle control application.

BACKGROUND

Original equipment manufacturers (OEMs) are providing increased vehicle control via mobile device interfaces. As this functionality expands, application developers are also being permitted to provide mobile device interfaces for vehicles.

Even within a family of OEM vehicles, let alone across OEMs, different function calls may result in different vehicle responses. Additionally, certain vehicles may lack a certain onboard functionality, so some indicated application functionality (e.g. digital versatile disk (DVD) control) may not be available in all vehicles, despite an application showing a control for the function.

Further, updates to vehicle software and/or functionality may require corresponding application updates to function calls to the vehicle, which can result in developers being forced to constantly update software to maintain compatibility with a wide variety of vehicles, or, alternatively, provide countless different versions of applications to service various OEMs, models or vehicle lines.

SUMMARY

In a first illustrative embodiment, a system includes a mobile device processor configured to request a control file, defining a plurality of available vehicle controls. The processor is also configured to receive the control set file and populate a mobile device interface based on the available vehicle controls. The processor is further configured to receive selection of one of the vehicle controls via the mobile device interface. The processor is additionally configured to configure a vehicle function call, defined in accordance with the vehicle-control in the control file and transmit the configured vehicle function call to a vehicle.

In a second illustrative embodiment, a method includes populating an interface of a mobile device with a plurality of vehicle controls obtained from a control file received to the mobile device. The method also includes accessing the control file to obtain a vehicle command for one of the vehicle controls selected from the interface and sending the obtained command from the mobile device to a vehicle for which the vehicle command is predefined.

In a third illustrative embodiment, a method includes receiving a request from a mobile device to hail a vehicle. The method also includes sending a verification key to the mobile device and to the vehicle, responsive to confirming the request and assigning the vehicle for passenger pickup and, responsive to determining that a control file, defining vehicle control commands issuable from a mobile device, and stored on the vehicle, is outdated, updating the control file with a new control file.

DETAILED DESCRIPTION

Figure 1:
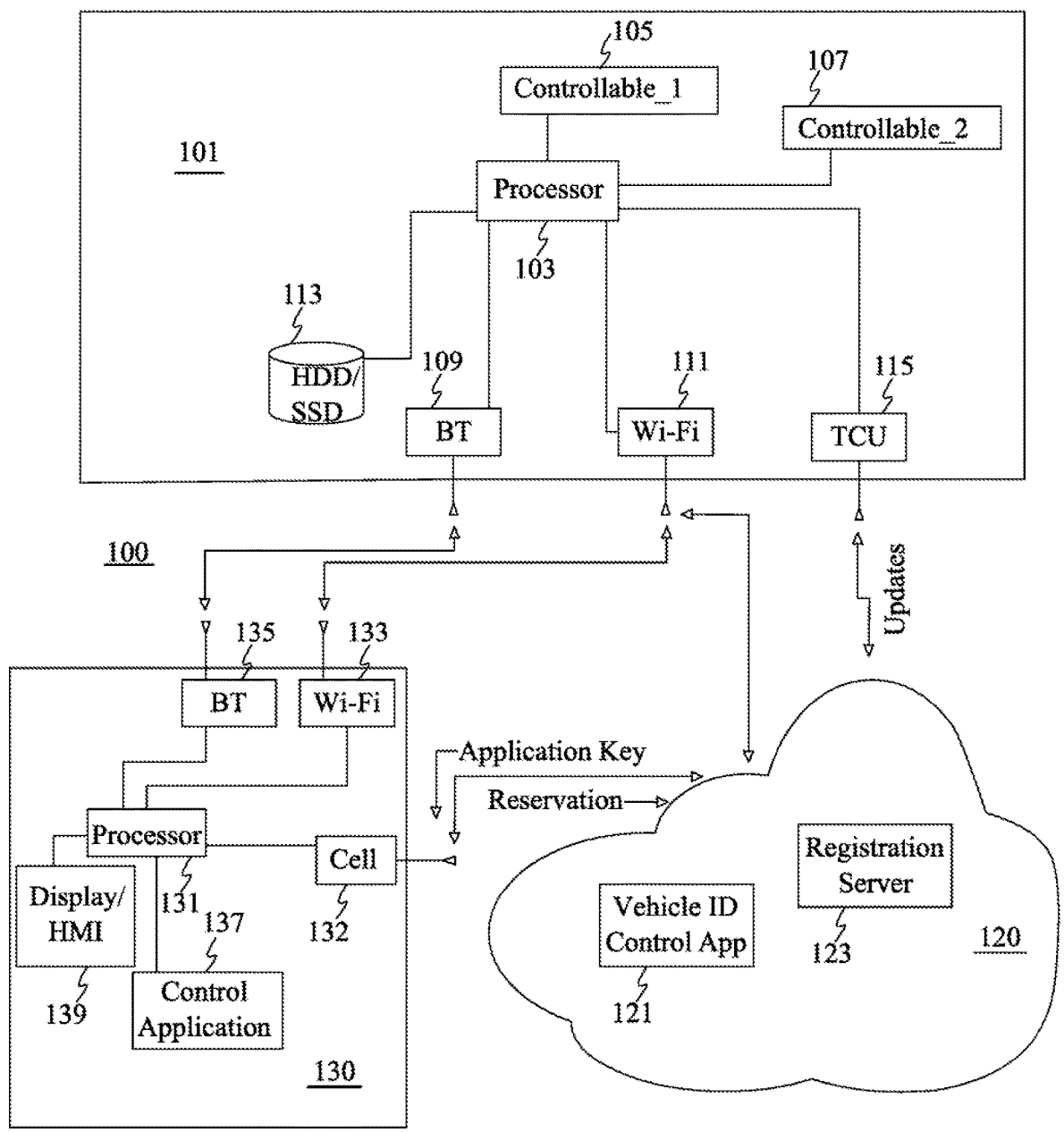
FIG. 1 shows an illustrative system for accessing and utilizing a dynamic application interface.

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

A difficulty facing application developers is that different vehicles from different manufacturers have different commands to execute a common function. For example, original equipment manufacturer (OEM) A may use a first command to control a heat setting, and OEM B may use a second command to control the same setting. Even though the desired outcome is the same, namely, changing a heating setting, the two systems may use different interface calls for performing the function.

Many vehicles include an application programming interface (API), in which the OEM has designated a set of common commands to produce consistent outcomes. While this may make it reasonably easy for an application developer to develop an application to control a given OEM's vehicles, the API commands may not persist across OEMs. Accordingly, if a developer wants to develop a robust application with multiple OEM functionality, the developer must include commands for multiple OEM interfaces, must maintain awareness, through the application, of which OEM's vehicle in which the user currently resides, and must update the application each time an OEM changes an API command.

Further, even within an OEM, different vehicles may have differing functionality. That is, while every vehicle may have heating controls, only some vehicles may have heated seating. Thus, an application may present controls for heated seating even if a user is in a vehicle that lacks heated seating. Pressing the control will, at best, do nothing, and may, at worst, send a command that could result in an error state within the vehicle.

Also, even if a user downloads an application to control a personal vehicle, such as an application provided by an OEM of the personal vehicle, that user may not always ride in the personal vehicle. Ridesharing is becoming a more common practice, and users may then be forced to download separate applications for each vehicle OEM providing a vehicle ridden-in by the user, if the user wants to control heating, radio and other settings in a rideshare vehicle.

Compounding this issue is the fact that rideshare drivers may not wish to give full control of a vehicle's systems to a passenger. The driver may want to restrict command sets for passengers and/or cap changes (e.g., prevent the passenger from suddenly turning the radio to maximum volume). Thus, even if the user downloads a control application associated with an OEM of a rideshared vehicle, the driver may not want to provide that user with access to the control.

The illustrative embodiments provide a generic interface that is command-agnostic when in an unloaded state. The interface is capable of receiving a list of both accessible and controllable functions, along with any specified constraints (e.g., the driver limits certain functions for passengers). At the same time, the interface may lack a native command set for interfacing with a vehicle, instead relying on a downloaded command set and interface. The application can use the downloaded command set to present a similar looking view for different vehicles, in the sense that the control buttons appear to be the same, but in the background the application will send different commands for a given vehicle based on the command set downloaded for that vehicle. This can also prevent presenting commands that do not apply to a given scenario, because non-applicable controls will not be included in the downloaded command set for a given vehicle. Since a driver can further set constraints, even if the vehicle includes, for example, a heated driver seat, a rideshare passenger will likely never be shown that control, as there would be little reason for a back-seat passenger to control the heated seat of a driver.

At the same time, OEMs can push updated commands and controls directly to vehicles, with which the OEM has direct communication in many instances, and thus the applications executing on user devices can receive the updated commands directly from the vehicle itself, without requiring a developer to release an update every time a command changes for a given make, model or OEM.

Thus, the user can have a dynamic, adaptable application that can control any vehicle with the appropriate process executing thereon (one that provides the command set) or accessible thereto (if the command set comes from the cloud). The user can thus have a single application that has multi-vehicle usage but does not require constant updates.

FIG. 1 shows an illustrative system 100 for accessing and utilizing a dynamic application interface. In this illustrative example, a vehicle 101 includes a processor 103 for controlling various vehicle 101 functions. Also, in this example, the vehicle 101 includes a plurality of controllable systems 105, 107, which are systems controllable via a wireless device 130 connected to a vehicle 101 processor 103 assuming the wireless device 130 sends the appropriate control command and has the appropriate permissions to control a given system 105, 107.

In order to communicate with the wireless device 130, the vehicle may also include one or more of BLUETOOTH 109 and Wi-Fi 111 transceivers, both or either capable of direct communication with the wireless device 130. These and similar wireless communication mediums (as well as wired mediums such as USB, for example), can be used to communicate information between the wireless device 130 and the processor 103.

In this example, the processor 103 is also connected to a storage device 113, which can include, for example, a hard disk drive, solid state drive, or other persistent memory. The storage device 113 can store one or more current, shareable versions of a command set and interface controls for a given vehicle 101. For example, a first set may be stored for the driver, a second set for approved passengers (e.g., family members), and a third set for limited-use passengers (e.g., customers). The driver or owner can configure which commands and limits for commands that are associated with each command set, and a given user may download the corresponding command set for use on that user's device 130, based on permissions assigned to that user by the vehicle 101 or the cloud 120.

The vehicle 101 also includes a telematics control unit (TCU) 115, that provides cellular access to the cloud 120. Among other things, the vehicle 101 can use the TCU 115 to obtain updates for command sets stored onboard in storage 113 and permissions assigned or granted (e.g. handshake parameters) for a given device 130 that might be entering in possession of a passenger.

The cloud 120 may include, in this example at least, a current vehicle control API command set 121 and a reservation server 123. The command set 121 may be designated on a per-vehicle basis, by an OEM, and may reflect the set of controls usable with a specific vehicle 101, based on option packages existing within that vehicle 101. The reservation interface 123 may be controlled by a ridesharing company, and it may or may not have direct access to the command set 121 for each vehicle 101 that can be reserved via the reservation server 123.

If a device 130 can directly download a command set 121 from the cloud 120 after making a reservation, the reservation server 123 may have access to each command set 121. But, because drivers may impose individual usage restrictions that vary by vehicle 101, and because those restrictions may not always be reflected in the cloud 120 command set 121, the device 130 may still be required to download the restrictions from the vehicle 101 before enabling the command set 121. In other examples, to diminish unnecessary data transfer between the cloud 120 and devices 130, the device 130 may simply receive credentials from the reservation server 123 and may use those credentials to download the command set when the device 130 can communicate with the rideshared vehicle 101.

In this example, the device 130 includes a cellular transceiver 132 that the device 130 can use to communicate with the cloud 120 reservation server 123. The device may also include Wi-Fi 133 and BLUETOOTH 135 transceivers, usable to communicate with the vehicle 101 and/or the cloud 120 (at least in the case of the Wi-Fi transceiver 133).

The device 130 also includes a processor 131, which may execute a control application 137 stored on the device. Execution of the control application 137 may cause the processor 131 to communicate with the vehicle 101 to receive a control set for use by the application 137. Use of the control set by the application 137 may cause the processor 131 to output a seemingly-specialized control set for a vehicle 101 on the display 139. Technically, the control set is specialized for the vehicle 101 because it corresponds to controls designated for use with the vehicle 101 and usable by the passenger, but the control set is not native to the application 137 and thus the custom appearance of the application 137 will change as each new vehicle 101 is entered and provides a control set.

Figure 2:
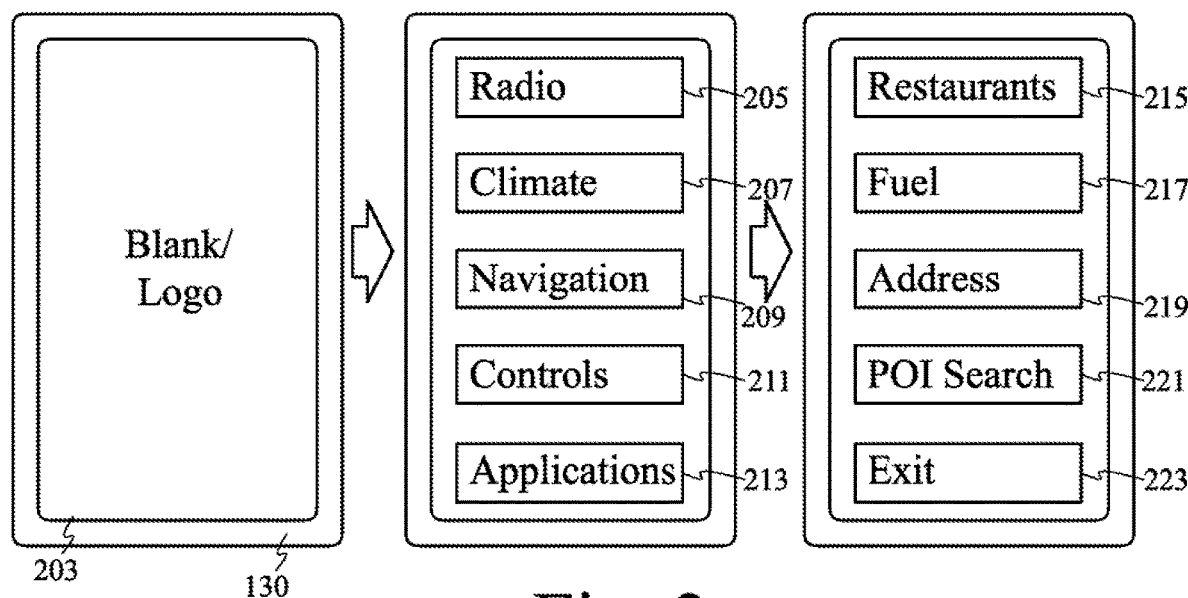
FIG. 2 shows a series of illustrative mobile device interfaces.

FIG. 2 shows a series of illustrative mobile device interfaces. In this example, the upon launching the application 137 on a device 130, the user may see the initial screen 203 provided to the display 139, which may be a blank screen or at least a screen lacking in controls for any particular vehicle 101. In some embodiments, if the user has a personal vehicle 101, that control set for the personal vehicle 101 may persist on this screen, unless the user is in a different vehicle 101 and has downloaded a new control set.

Once the device 130 has downloaded a control set for a vehicle 101 from the vehicle 101, the application 137 may load the particular display set for the vehicle 101, and screen display 203 may change to show a set of commands both usable by the device 130 and usable with the vehicle 101. In this example, those commands include, for example, radio control 205, climate control 207, navigation control 209, other controls 211 and applications 213 installed on the vehicle 101.

Selection of a particular command may result in still a further display with a sub-menu, as the screen display 203 changes based on the downloaded command set reflecting the available sub-menus for a given command. In addition to ensuring compatibility for each vehicle 101, the device 130 can also preserve look and feel of commands, so that graphical controls for the application 137 can remain consistent even if the actual device being controlled changes.

In this example, the user has selected the navigation 209 function, resulting in the submenu for displaying restaurant options 215, fuel options 217, address searching 219, generalized navigation searching 221 (e.g., POI searching by category) and an exit function 223 to return to the primary menu. The particulars of a primary menu or sub menu may change with different interfaces, but the user may still be presented with consistent controls (if desired), e.g., a consistent keyboard or consistent heating/ventilation/air conditioning (HVAC) controls that are agnostic of vehicle 101 type, except that the underlying commands that they send back to the vehicle 101 are driven by the downloaded command set.

Figure 3:
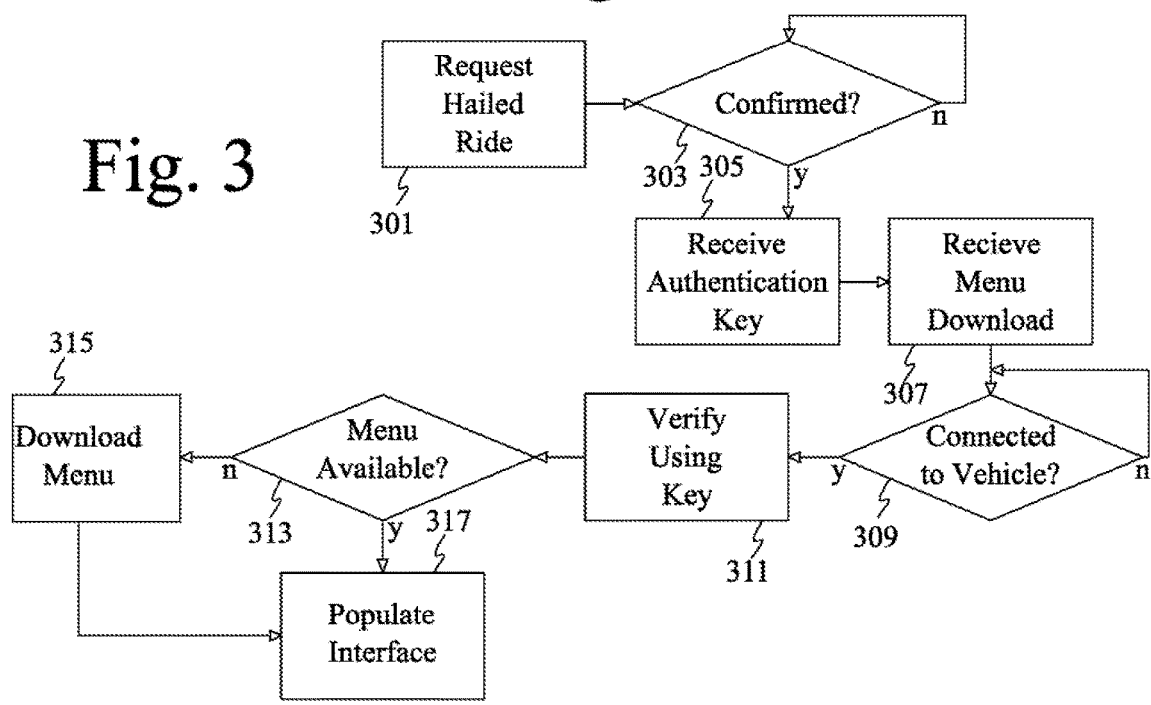
FIG. 3 shows an illustrative process for interface download.

FIG. 3 shows an illustrative process for interface download, executable by a mobile device 130 processor 131. In this example, the user may use a mobile device 130 application to request a ride at 301. The ride requesting application may be independent of the control application 137, or the control application 137 may be launched by, or included as part of, the ride requesting application. Once the ride requesting application confirms the availability of an identified vehicle 101 at 303, the mobile device 130 may download an encryption key or other credential from the cloud 120 reservation server 123 at 305.

In some embodiments, the device 130 may also download a command set (menu) 307 template 121 from the cloud 120, but in other embodiments this command set may only be available from the vehicle directly. In instances where the user can download the command set from the cloud, the user could use the menu to preconfigure the vehicle settings, which could be communicated to the vehicle 101 through the cloud 120, taking effect, for example, after a previous passenger had been dropped off.

For example, if the user wants to precondition the cabin to 72 degrees, the vehicle 101 may receive the command from the cloud 120 and may, following drop off, condition the cabin accordingly an appropriate amount of time before pickup (e.g., 5 minutes before arrival). Radio settings and the like may take effect when the vehicle actually arrives, so that the user can enter a planned environment without overly interfering with the driver or other previous passengers.

In other examples, the menu may be a static, non-functionary presentation of options that will be available to the user when the user enters the vehicle 101. And, as previously noted, in still further examples the menu may not even be available until the user actually can directly communicate between the device 130 and the vehicle 101 and/or enters the vehicle 101.

Once the device 130 is connected to the vehicle 101 at 309 (and/or is detected within the vehicle 101 if that restriction also exists), the device 130 can use the downloaded key or credentials to verify the permissibility of the device 130 control of a vehicle controllable system 105, 107. The key or credentials may have a time component, being only usable as long as the ride continues, or may have other short-term use constraints associated therewith when used in a ride-sharing setting. When used with rental vehicles or other temporary vehicles, other constraints or time-parameters may control the validity of a given set of credentials.

If the device 130 already has a menu downloaded from the cloud 120 at 313, the device 130 may populate a display interface 203 with the appropriate commands at 317 (assuming these were not already present). The device 130 can also enable those commands at this time, if not already enabled as previously discussed.

If the device 130 does not yet have the menu downloaded at 313, the device 130 may use the credentials to request download of the menu at 315 and then populate the display interface 203 at 317 using the downloaded menu.

Figure 4:
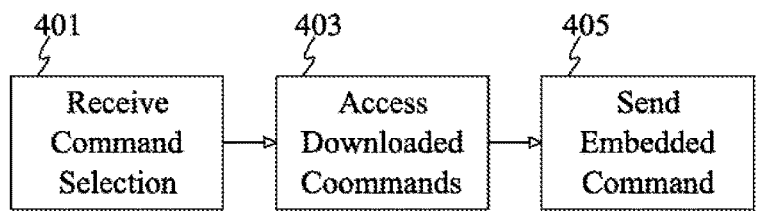
FIG. 4 shows an illustrative process for interacting with a downloaded interface.

FIG. 4 shows an illustrative process for interacting with a downloaded interface that may be performed by mobile device 130 processor 131, for example. In this example, the mobile device 130 has already displayed the display screen 203 with a command set downloaded from the vehicle 101. This command set gives access to the displayed features, and a user interacts with the mobile device 130 display 139 to select a command.

When the mobile device 130 receives a command selection at 401, the mobile device can perform a lookup at 403 based on the template of downloaded commands. That is, the command displayed on the display 139 may read "navigation→search," but there may be a specific command or set of commands that the mobile device 130 sends to the vehicle 101. These commands may be formatted for the vehicle specific API, and since the commands are included in a downloaded control template, the application 137 is capable of obtaining the present and functional command set for each vehicle 101 with which the application 137 interfaces.

Using the commands downloaded from the vehicle 101, the mobile device 130 sends the designated command from the template to control the particular function at 405.

Figure 5:
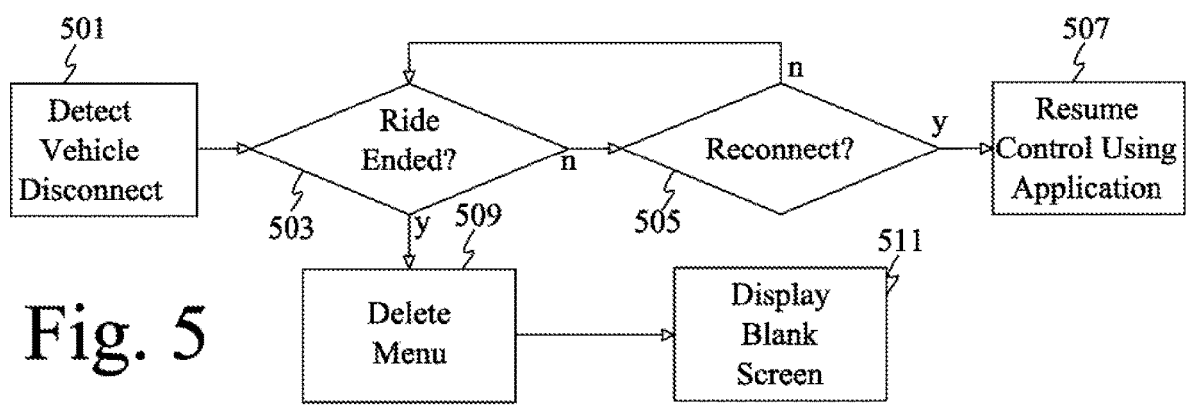
FIG. 5 shows an illustrative process for removing an interface.

FIG. 5 shows an illustrative process for removing an interface, executable by a mobile device 130 processor 131, for example. In this illustrative embodiment, the mobile device 130 may detect a disconnect from the vehicle 101 at 501. This could be due to a user disabling BLUETOOTH on the mobile device 130, to save battery power, for example, or this disconnect could be due to the user and mobile device 130 leaving the vehicle 101.

In this example, the mobile device 130 will receive an indication from a ridesharing application that a hired ride has ended at 503. In other instances, the mobile device may be informed from, for example, a vehicle rental application that a rental period is over. When the user is using the dynamic interface in a commonly-utilized vehicle 101, the user may not actually want to remove the downloaded template, but in other instances, such as hailed-rides or rented vehicles, the user likely has little to no use for the downloaded interface following the ride. Moreover, redownloading the interface from the vehicle 101, even if it is used again in the future, may only take a few seconds of time and will allow the user to ensure the mobile device 130 includes an up-to-date version of the interface.

If the ride has not ended at 503, or if the mobile device 130 has received no indication of a ride ending, the mobile device 130 may attempt to reconnect at 505 until the ride ends. Reconnection may occur, for example, if BLUETOOTH functionality is resumed or if the device 130 is restarted after being powered down during a ride. If reconnection occurs, the device 130 can resume control functionality at 507, using the template already downloaded for that ride.

On the other hand, if the ride has ended at 503, the mobile device 130 may delete the template at 509 from mobile device 130 memory, since the mobile device 130 and/or user may have no further need for the template. Deletion of the template can cause the mobile device 130 to revert to a blank display at 511, or display of a common display corresponding to an owned-vehicle, for example, to be used when a user is not in a hailed-ride or rental-ride scenario.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein,

What is claimed is:

1. A system comprising:
   a processor of a mobile device, configured to
      wirelessly request a control file, from a server, defining a plurality of available vehicle controls, in response to requesting a hailed vehicle via the mobile device;
      receive the control file from the server and populate a mobile device interface based on the available vehicle controls;
      receive selection of one of the vehicle controls via the mobile device interface;
      configure a vehicle function call, defined in accordance with the vehicle control in the control file; and
      transmit the configured vehicle function call to a vehicle.

2. The system of claim 1, wherein the control file is requested from and received from the vehicle.

3. The system of claim 1, wherein the control file is requested from and received from a server remote from the mobile device and providing ride-hailing request-handling functionality.

4. The system of claim 1, wherein the processor is further configured to present a configurable aspect of the selected vehicle control, the configurable aspect defined in the control file.

5. The system of claim 4, wherein the processor is configured to configure the vehicle function call to reflect a user-designated value for the configurable aspect.

6. The system of claim 5, wherein the configurable aspect includes a value within a bounded range defined in the control file, the bounded range being predefined as a range that is less than a possible unbounded range for the vehicle control.

7. The system of claim 4, wherein the configurable aspect includes an on/off state.

8. The system of claim 1, wherein the request specifically identifies the hailed vehicle, responsive to receiving a specific identification of the hailed vehicle following requesting the hailed vehicle.

9. The system of claim 1, wherein the processor is configured to issue the request directly to the hailed vehicle responsive to receiving an indicator from the hailed vehicle that the hailed vehicle is within direct wireless communication range of the mobile device.

10. The system of claim 9, wherein the processor is configured to send a key from the mobile device to the vehicle with the request, the key verifiable by the hailed vehicle and received by the mobile device from a remote server responsive to requesting the hailed vehicle.

11. The system of claim 1, wherein the vehicle controls include infotainment controls.

12. A method comprising:
    populating an interface of a mobile device with a plurality of vehicle controls obtained from a control file received by the mobile device from a server, in response to requesting the vehicle as a hailed vehicle;
    accessing the control file to obtain a vehicle command for one of the vehicle controls selected from the interface; and
    sending the obtained command from the mobile device to a vehicle for which the vehicle command is predefined.

13. The method of claim 12, wherein the control file is received from a server providing ride-hailing request-handling functionality.

14. The method of claim 12, wherein the control file is received from the vehicle in response to a request from the mobile device issued to the vehicle in response to the vehicle entering direct communication-range of the mobile device.

15. The method of claim 14, further comprising:
    receiving a verification key, verifiable by the vehicle, from a server providing ride-hailing request-handling functionality; and
    including the verification key in the request from the mobile device to the vehicle.

16. The method of claim 12, further comprising:
    providing a configurable parameter associated with the vehicle command, on the mobile device interface, responsive to the selection of the vehicle control;
    receiving a user-defined setting of the configurable parameter via the mobile device interface; and
    configuring the vehicle command in accordance with the user-defined setting, in a manner defined by the control file.

17. The method of claim 12, wherein the vehicle controls include infotainment controls.

* * * * *